J. C. GASTON.
Bee Hive.
No. 83,952.
Patented Nov. 10, 1868.
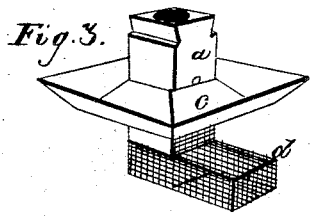
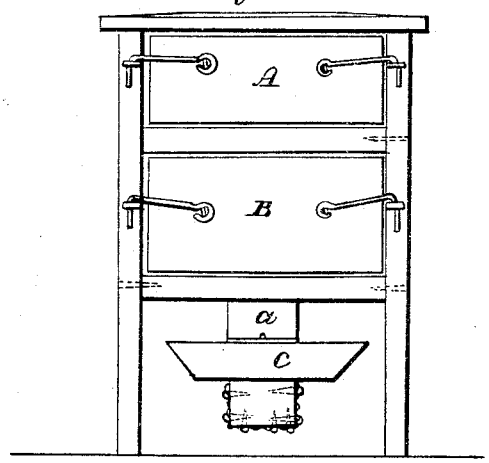
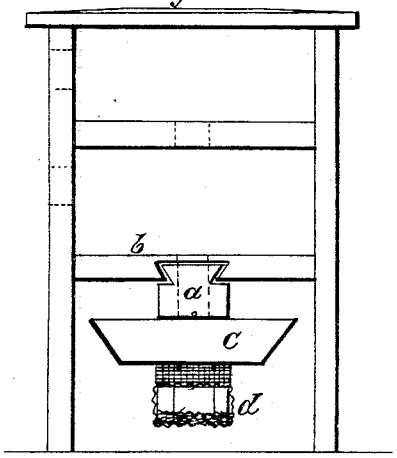

J. C. GASTON, OF CINCINNATI, OHIO.

Letters Patent No. 83,952, dated November 10, 1868.

IMPROVEMENT IN BEE-HIVES.

The Schedule referred to in these Letters Patent and making part of the same.

*To all whom it may concern:*

Be it known that I, J. C. GASTON, of Cincinnati, in Hamilton county, in the State of Ohio, have invented certain new and useful Improvements in Bee-Hives; and I do hereby declare that the following is a full and exact description thereof, reference being had to the accompanying drawings, and to the letters of reference marked thereon.

Figure 1 represents the front of my improved bee-hive.

Figure 2 represents the rear elevation of the same.

Figure 3 represents the detachable entrance-protector removed.

The leading object of my invention is to provide an efficient means of protecting the hive from insects, such as moths, ants, and worms, which usually infest bees.

I construct my hive in any of the ordinary forms, to which my insect-detector may be readily attached. A B are removable doors, opening into apartments of the hive. The lower and larger apartment may be provided with suitable frames, upon which the bees may form their comb, and the upper apartment may be occupied with removable boxes.

The hive may be suitably ventilated by apertures covered with wire gauze, and proper openings are provided to admit the bees from one apartment to another.

In fig. 3, *a* denotes a square pipe or box, having formed upon its upper end a dovetail tenon, which will closely fit into the correspondingly-formed mortise *b*. This vertical portion of the passage for the bees is surrounded by the water-receptacle *c*, and its lower end is furnished with a wire-gauze passage-way, *d*, which projects at right angles from the bottom of the vertical passage-way, and extends laterally a considerable distance from the body of the bee-hive. The bees can have access to the hive only through this right-angular passage. When a swarm of bees is to be placed in the hive, the large door will be removed for the purpose, and the light which will enter through the vertical portion of the passage-way *a* will enable the bees to find the place of egress.

The arrangement of the passage-way for egress and regress is such that insects cannot approach it by first ascending upon the hive, as in that case they will find the receptacle of water surrounding the passage-way an impassable obstacle; and as the wire-gauze portion of the passage-way extends horizontally some distance from the hive, any odor emitted from the hive, which would attract the moth, would be dispelled before reaching the extreme end, and entrance of the wire-gauze opening, and consequently the moth would not be able to find the actual place of entrance. Moreover, the mesh or gauzy texture of the material constituting the greater portion of the passage-way, will deter insects from coming in contact with it, as it is well known that flying insects generally avoid objects of such a nature.

A suitable aperture at the bottom of the hive is made, to allow the bees to enter through the passage-way *d a* into the hive.

I am aware that various means of destroying insects have been devised and applied to bee-hives, but I am not aware of any device for the purpose which has proven so effectual, and at the same time is capable of application to hives of all forms, as my present invention.

Having fully described my invention,

What I claim, and desire to secure by Letters Patent, is—

In combination with a bee-hive, the angular passage-way *a d*, and receptacle *c*, arranged and used in the manner described.

In testimony whereof, I have hereunto set my hand, this 3d day of July, 1868.

J. C. GASTON.

Witnesses:
H. P. K. PECK,
JAS. GREGG.